United States Patent
Kelley et al.

(10) Patent No.: US 8,082,351 B1
(45) Date of Patent: Dec. 20, 2011

(54) SOFTWARE LOAD BALANCING FOR SESSION REQUESTS THAT MAINTAIN STATE INFORMATION

(75) Inventors: Winslow B. Kelley, Natack, MA (US); Michael F. Kraley, Lexington, MA (US); Paul S. Kleppner, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 202 days.

(21) Appl. No.: 12/455,004

(22) Filed: May 26, 2009

(51) Int. Cl.
*G06F 15/16* (2006.01)
(52) U.S. Cl. .......................... 709/227; 709/228; 709/229
(58) Field of Classification Search .................. 709/227, 709/228, 229, 217, 219; 370/328; 713/151
See application file for complete search history.

(56) References Cited

U.S. PATENT DOCUMENTS

| | | | |
|---|---|---|---|
| 2002/0112152 A1* | 8/2002 | VanHeyningen et al. ..... | 713/151 |
| 2008/0155106 A1* | 6/2008 | Hans et al. .................... | 709/227 |
| 2008/0228930 A1* | 9/2008 | Tatsubori ...................... | 709/228 |
| 2010/0157882 A1* | 6/2010 | Moriwaki et al. ............. | 370/328 |
| 2010/0223357 A1* | 9/2010 | Einarsson et al. ............ | 709/219 |
| 2011/0058520 A1* | 3/2011 | Keller et al. .................. | 370/328 |

* cited by examiner

*Primary Examiner* — Le Luu
(74) *Attorney, Agent, or Firm* — Van Pelt, Yi & James LLP

(57) ABSTRACT

Software load balancing is provided. In some embodiments, software load balancing includes receiving a session request from a client for a session between the client and a service associated with a set of servers, in which the set of servers includes a plurality of servers including a first server and a second server; designating the first server for the session request; sending an indication of the first server to the client in response to the session request, in which the client can communicate directly with the first server; receiving a resume session request from the client to resume the session between the client and the service associated with the set of servers; designating the second server for the resume session request; and sending a set of state information associated with the session to the second server, in which the client can communicate directly with the second server.

25 Claims, 13 Drawing Sheets

SOFTWARE LOAD BALANCING FOR SESSION REQUESTS THAT MAINTAIN STATE INFORMATION

BACKGROUND OF THE INVENTION

Network load balancing for workload among servers exists for stateless (e.g., non-persistent) applications (e.g., various forms of web browsing of HTML pages). For example, multiple servers in a server pool (e.g., worker pool, cluster of servers, and/or server cloud) can provide a service (e.g., a web/Internet based service) in which the workload requests from various clients are allocated between and/or among each of the multiple servers.

BRIEF DESCRIPTION OF THE DRAWINGS

Various embodiments are disclosed in the following detailed description and the accompanying drawings.

DETAILED DESCRIPTION

Figure 1:
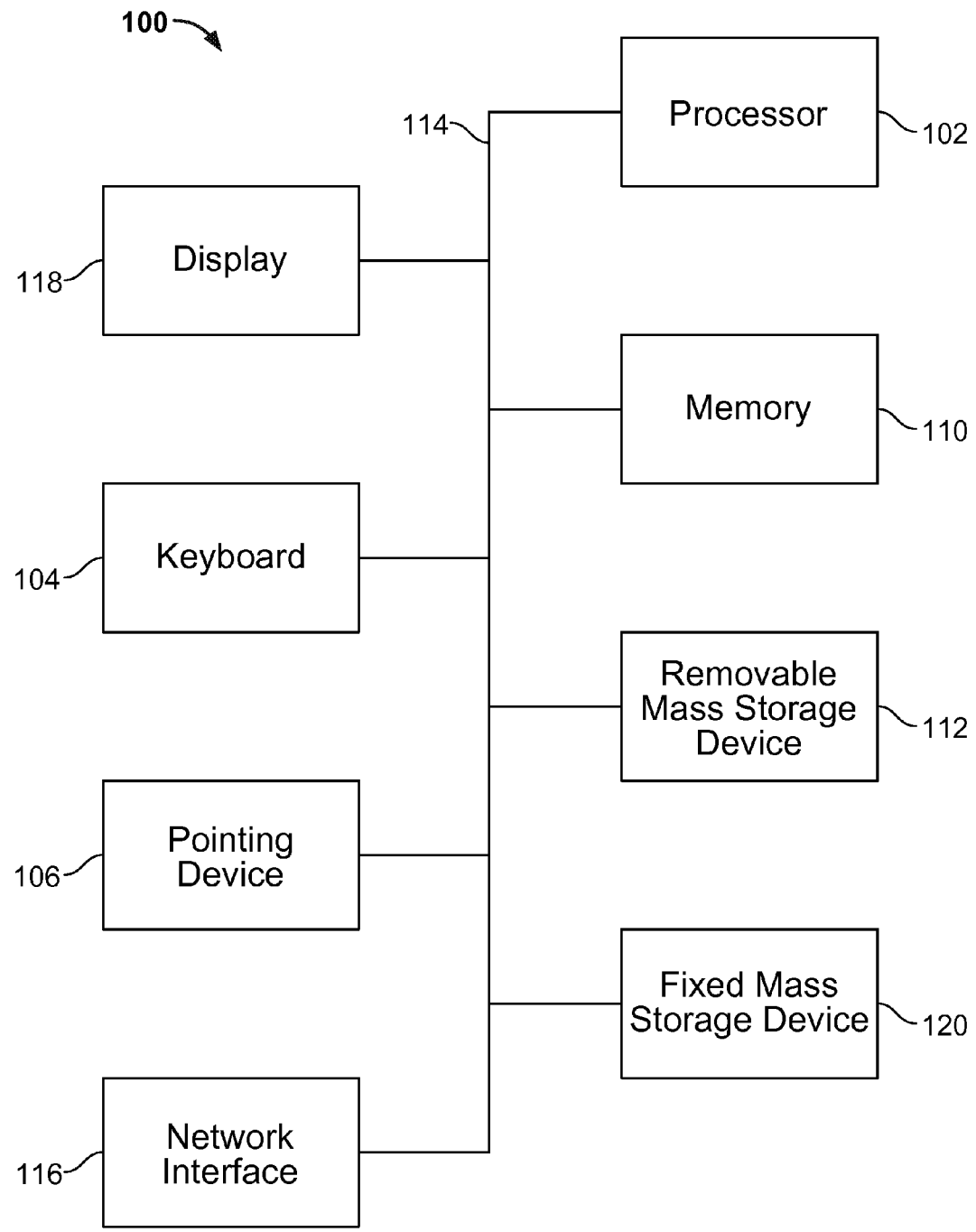
FIG. 1 is a functional diagram illustrating a programmed computer system for executing software load balancing in accordance with some embodiments.

Various embodiments can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the various approaches of the various embodiments disclosed herein may take, may be referred to as techniques. In general, the order of the steps of disclosed processes may be altered within the scope of the techniques. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the techniques. The techniques are described in connection with such embodiments, but the techniques are not limited to any embodiment. The scope of the techniques is limited only by the claims and the techniques encompass numerous alternatives, modifications and equivalents. Numerous specific details are set forth in the following description in order to provide a thorough understanding of the techniques. These details are provided for the purpose of example and the techniques may be practiced according to the claims without some or all of these specific details. For the purpose of clarity, technical material that is known in the technical fields related to the techniques has not been described in detail so that the techniques are not unnecessarily obscured.

Network load balancing for workload among servers exists for stateless (e.g., non-persistent) applications (e.g., various forms of web browsing of HTML pages). For example, multiple servers in a server pool (e.g., worker pool or server cloud) can provide a service (e.g., a web/Internet based service) in which the workload requests from various clients are allocated between and/or among each of the multiple servers.

However, software load balancing for applications in which state information is provided/maintained (e.g., persistent sessions of applications in which maintaining state based information is required or beneficial) is needed. Accordingly, in some embodiments, software load balancing is provided that includes receiving a session request from a client for a session between the client and a service associated with a set of servers (e.g., providing a service for a persistent application implemented using an Adobe® Flex® based platform, and/or any other platform/implementation), in which the set of servers includes a plurality of servers including a first server and a second server; designating the first server for the session request; sending an indication of the first server to the client in response to the session request, in which the client can communicate directly with the first server; receiving a resume session request from the client to resume the session between the client and the service associated with the set of servers; designating the second server for the resume session request; and sending a set of state information associated with the session to the second server (e.g., a list of documents that the user should have access to on the server), in which the client can communicate directly with the second server. Accordingly, a software load balancing is provided that maintains persistent sessions (e.g., provides state based information from a prior, interrupted session to a failover server for a resumed session, such as for any client application and/or browser plug-in that requires a stateful/persistent session/connection for a service/to a set of servers). For example, quick and efficient recovery to a server failure is important for interactive applications (e.g., interactive web based and/or multimedia applications, such as FLASH based applications for video, audio, multimedia or any other interactive content).

FIG. 1 is a functional diagram illustrating a programmed computer system for executing software load balancing in accordance with some embodiments. As shown, FIG. 1 provides a functional diagram of a general purpose computer system programmed to perform software load balancing in accordance with some embodiments. As will be apparent, other computer system architectures and configurations can be used to perform context sensitive script editing for form design. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to provide the various elements of embodiments of system 200 as described below with respect to FIGS. 2 through 7 and/or executes/performs the processes as described below with respect to FIGS. 8 through 11.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions (e.g., programmed instructions). For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110 (e.g., RAM) as virtual memory.

In addition to providing processor 102 access to storage subsystems, bus 114 can be used to provide access other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions), from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
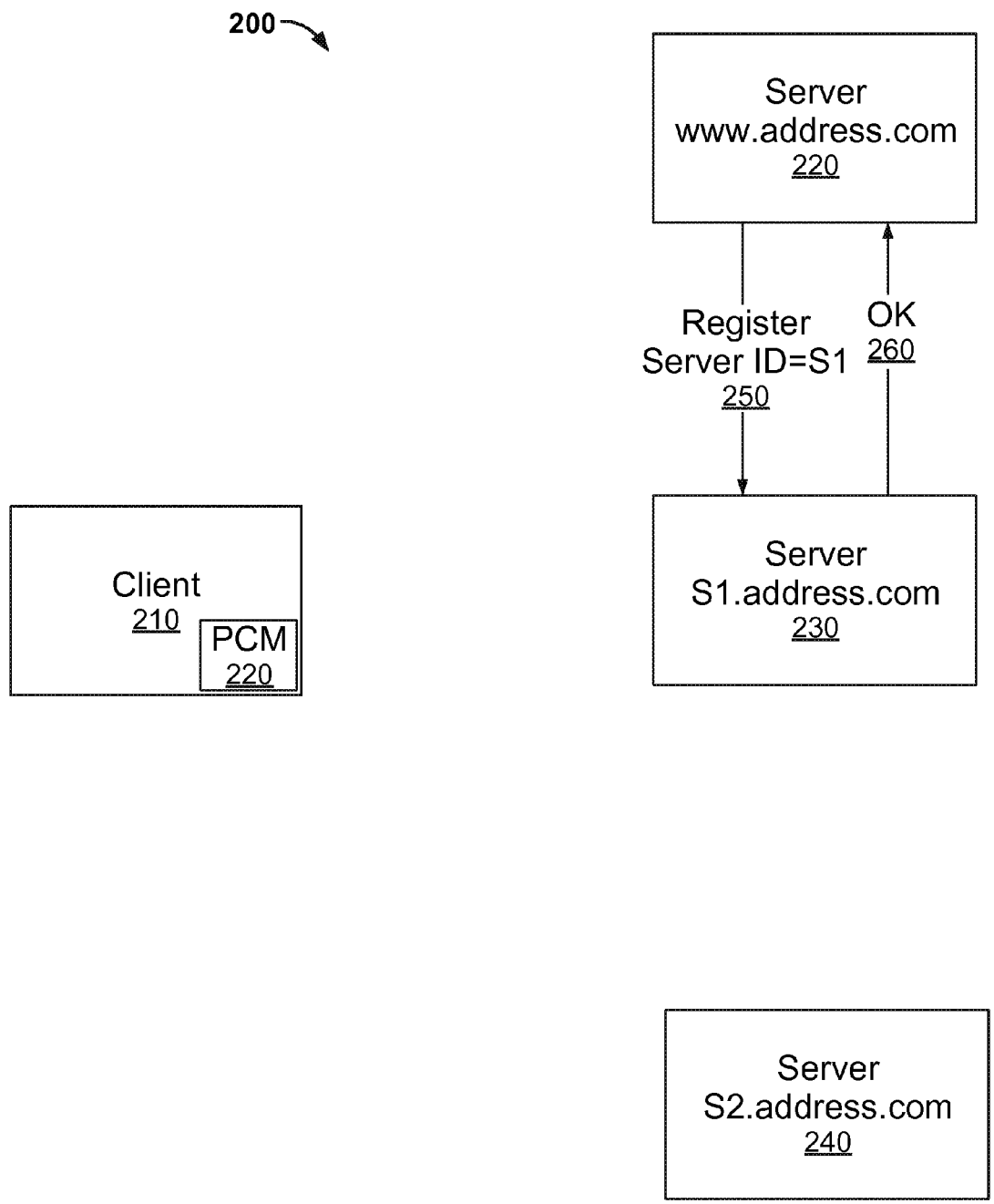
FIG. 2 illustrates a system for software load balancing in which a first server is registered in accordance with some embodiments.

FIG. 2 illustrates a system for software load balancing in which a first server is registered in accordance with some embodiments. In particular, FIG. 2 illustrates a system 200 that includes a client 210 (e.g., programmed processor 102 and/or programmed computer system 100, or any other computing device, such as a mobile phone, smart phone, PDA, netbook, laptop, computer desktop, entertainment/gaming device, music player device, personal navigation device, and/or video player device) and a set of servers including servers 220, 230, and 240 (e.g., each of the servers can be implemented as a programmed processor 102 and/or programmed computer system 100, or any other form of a computer server and/or computing appliance, such as an application/web server/appliance). In some embodiments, the servers 220, 230, and 240 provide a service accessible via a network, such as the Internet (e.g., via www.address.com). In some embodiments, the server (s1.address.com) 230 provides software load balancing for the service, and the server (s2.address.com) 240 also provides software load balancing for the service. In some embodiments, the client 210 is in network communication with the set of servers 220, 230, and 240 via the Internet (e.g., using wired and/or wireless network communications).

In some embodiments, the client 210 includes a persistent connection manager (PCM) 210 as shown. For example, the PCM 210 can be implemented in software executed on a processor (e.g., processor 102). In some embodiments, the client 210 downloads a software application (e.g., an Adobe® Flex® based application, such as an Adobe® Flash® application) from the server 220. In some embodiments, the downloaded software application includes the PCM 220 as a module, logic, or component of the downloaded software application. In some embodiments, the downloaded software application also includes a central network address (e.g., www.address.com for the server 220) for initiating a network connection with a network server for the downloaded software application (e.g., a collaborative software platform that provides a continuous network backup/replication of document edits or state information for viewed/edited/played documents/content). In some embodiments, the central network address is the same network address from which the software application is downloaded. In some embodiments, the server 220 is a network load balancer that assigns an available server to various client requests.

As shown in FIG. 2, the server 220 registers 250 (e.g., Register ServerID=S1) the server 230 for providing the first service. The server 230 responds to confirm 260 (e.g., OK) that it is registered to provide the first service.

Figure 3:
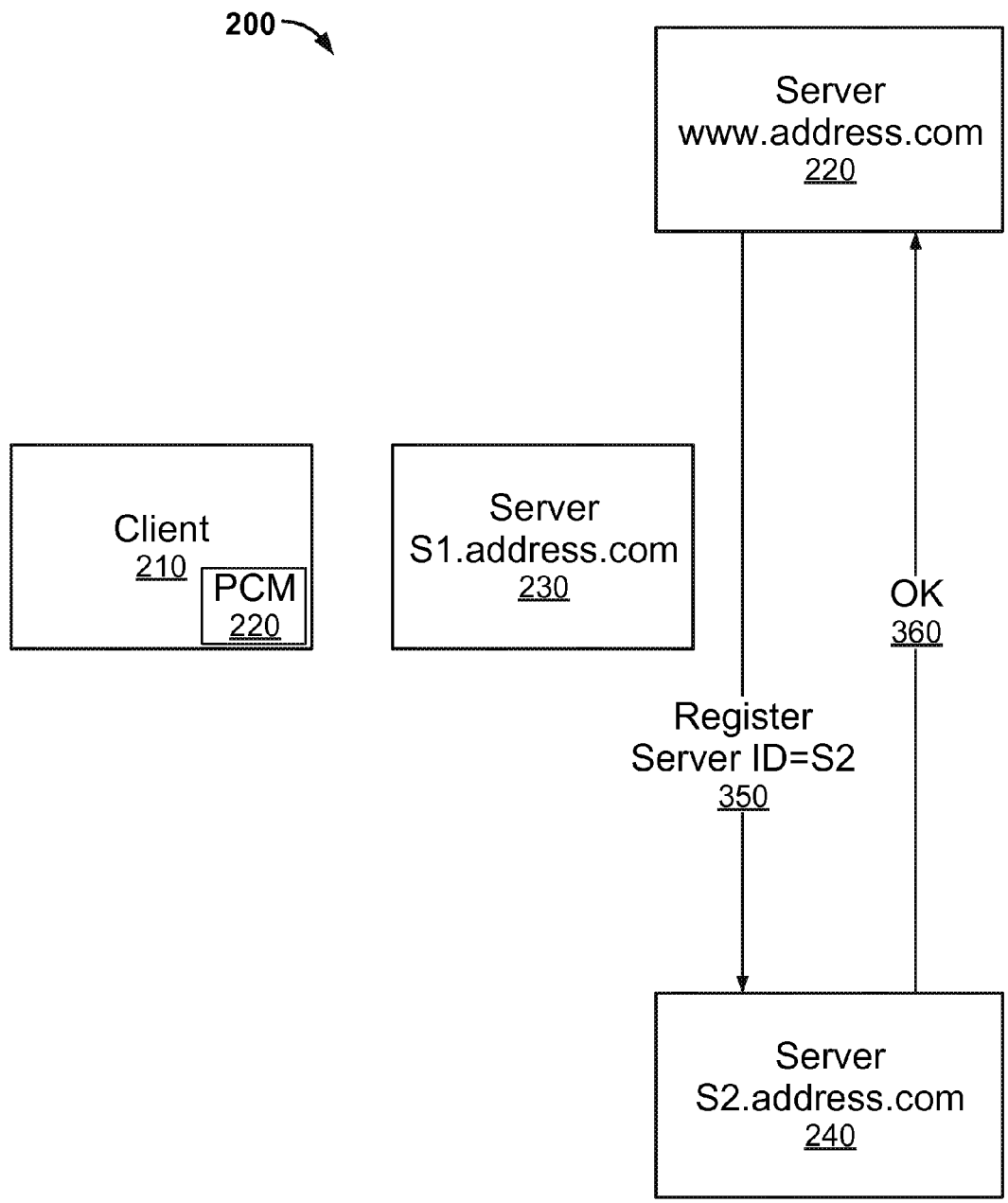
FIG. 3 illustrates a system for software load balancing in which a second server is registered in accordance with some embodiments.

FIG. 3 illustrates a system for software load balancing in which a second server is registered in accordance with some embodiments. As shown in FIG. 3, the server 220 registers 350 (e.g., Register ServerID=S2) the server 240 for providing the first service. The server 240 responds to confirm 360 (e.g., OK) that it is registered to provide the first service.

Figure 4:
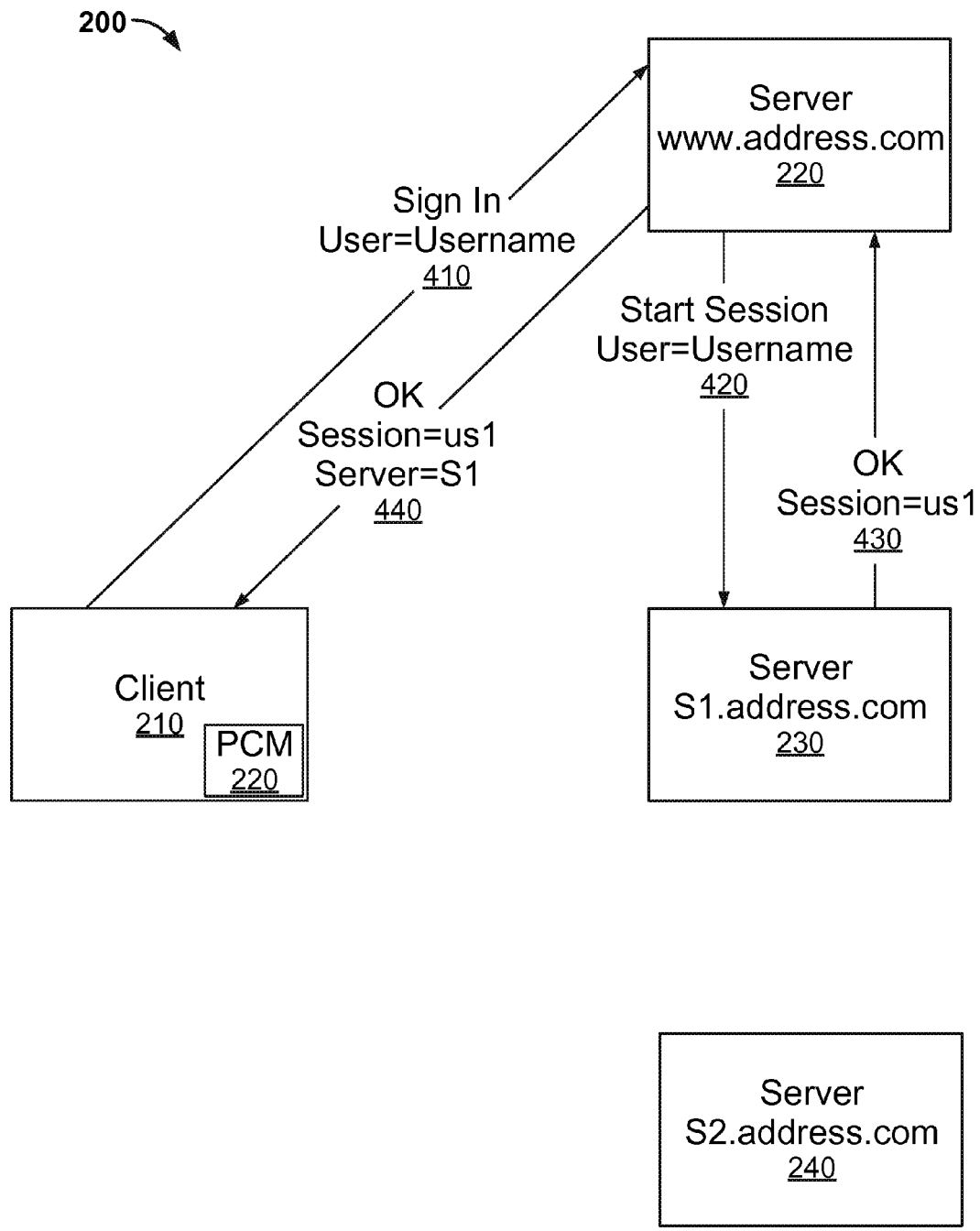
FIG. 4 illustrates a system for software load balancing in which the first server is designated in response to a session request from the client in accordance with some embodiments.

FIG. 4 illustrates a system for software load balancing in which the first server is designated in response to a session request from the client in accordance with some embodiments. The client 210 sends a new session request 410 (e.g., SignIn user=username, providing, for example, user credentials for a session/service login, which may include a username and password and/or any other user credentials) to access the service to the server 220 (e.g., central server of the set of servers). The server 220 determines an available server in the set of servers to respond to the client 210 request. In some embodiments, the server 230 is selected by, for example, using a hashing function. The server 220 sends a new session request 420 (e.g., StartSession user=username) to the server 230. The server 230 responds to confirm the new session request 430 (e.g., OK Session=us1) to the server 220. The server 220 responds to confirm the new session request 440 (e.g., OK sessionus1 Server=S1) to the client 210, in which the server 230 is indicated as the designated server for the new session for the client 210. In some embodiments, data is returned (e.g., a token/ticket or session cookie can be returned via response 440) to the client 210, that allows the client 210 to efficiently reconnect/reestablish/resume a session connection with the set of servers. For example, a token/ticket or session cookie can be used for a server side lookup to determine state (e.g., a list of documents previously accessed/cached and/or user credentials, etc.), and the state information can be sent from the server 220 to the new designated server 240, as discussed below with respect to, for example, FIG. 7 (e.g., when the client 210 connects directly to the new designated server 240, the client 210 can provide that token/ticket or session cookie to the new designated server 240 for state information lookup).

Figure 5A:
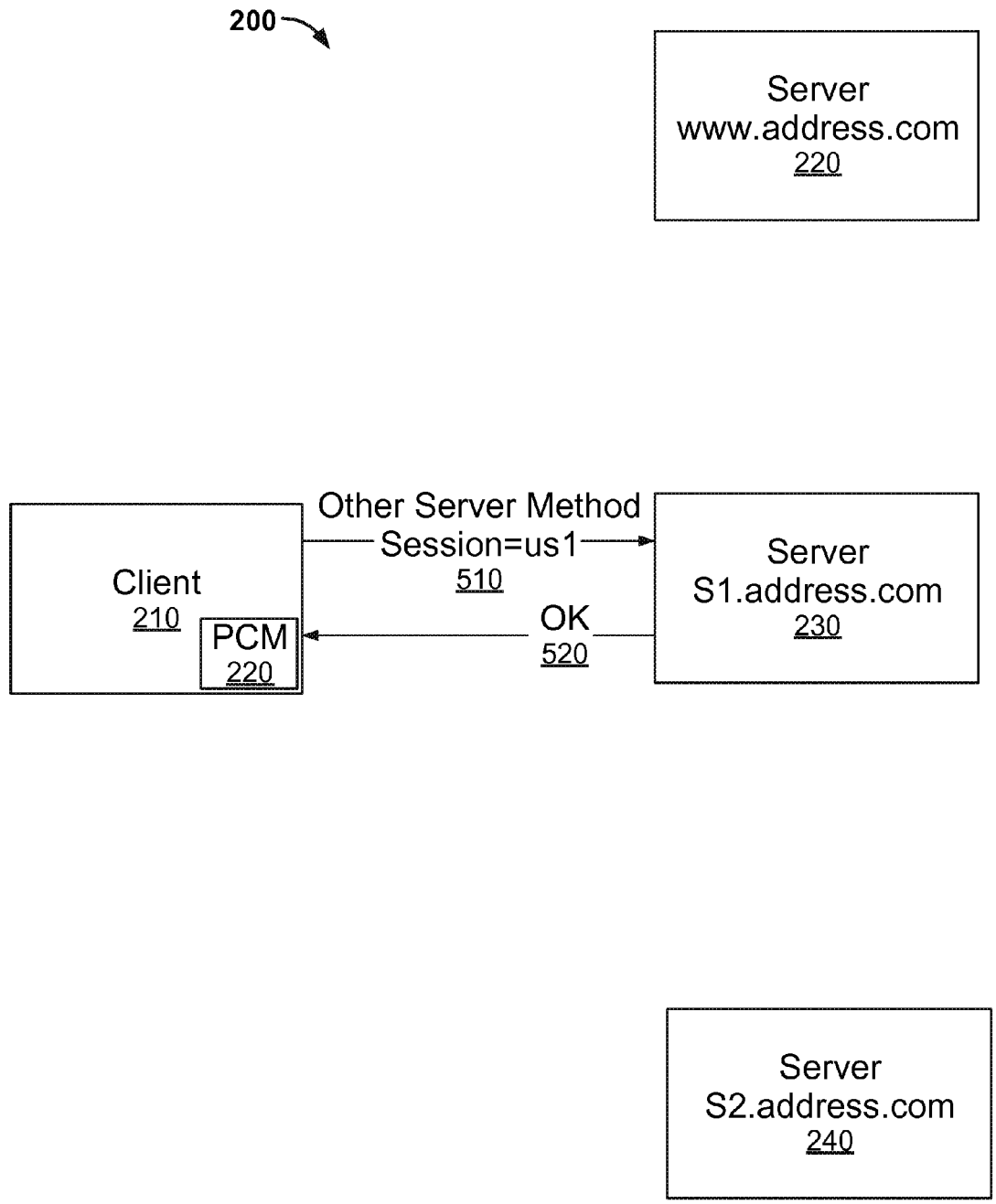
FIGS. 5A and 5B illustrate a system for software load balancing in which the first designated server becomes unavailable for the service in accordance with some embodiments.
Figure 5B:
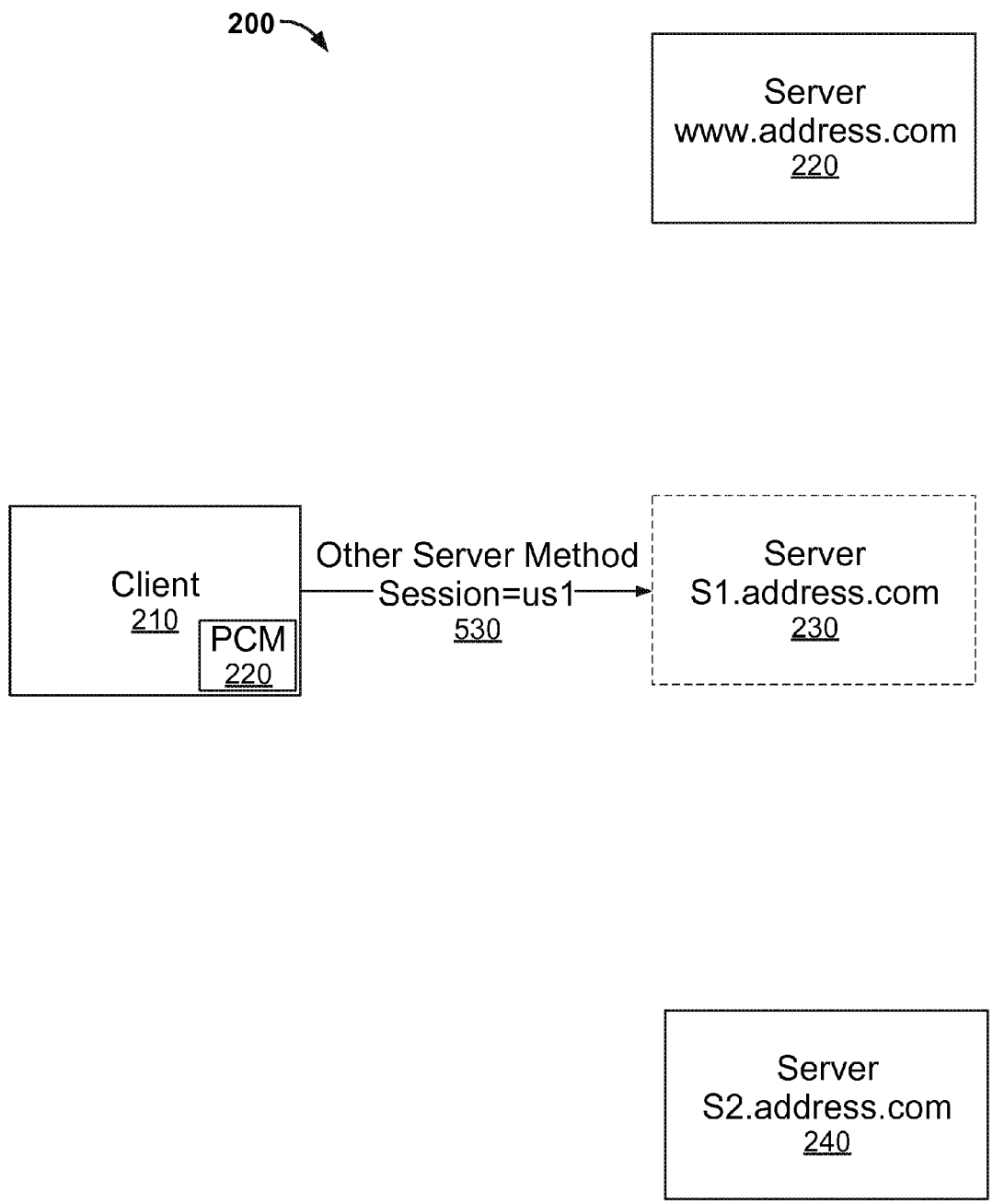

In some embodiments, the PCM 220 stores the assigned server ID provided in the response 440 from server 220 (e.g., Server=S1, the server 230). The PCM 220 can then direct the network communications for the software application to the assigned server, as discussed below with respect to FIG. 5A. In some embodiments, the PCM 220 synthesizes the network address for the assigned server by, for example, appending the server name/ID of the assigned server (e.g., a string that includes the server name/identifier) to the central network address (e.g., or various other techniques can be used to synthesize, look-up, retrieve, store, and/or otherwise determine the network address of the assigned server). FIGS. 5A and 5B illustrate a system for software load balancing in which the first designated server becomes unavailable for the service in accordance with some embodiments. Referring to FIG. 5A, the client 210 initiates the new session 510 (e.g., OtherServerMethod Session=us1) with the server 230. The server 230 confirms the new session initiation 520 (e.g., OK) with the client 210. Referring now to FIG. 5B, in some embodiments, the server 230 can become unavailable (e.g., offline and/or otherwise become unresponsive/out of communication) to the client 210 for the service, temporarily and/or permanently. As shown in FIG. 5B, the server 230 is unavailable to the client 210 for the server, temporarily and/or permanently (e.g., indicated by the dashed line outline of the server 230). In particular, the client 210 sends a request 530 (e.g., OtherServerMethod Session=us1) to the server 230, and does not receive a timely response. As a result, the client 210 determines that the server 230 is unavailable to the client 210 for the service; temporarily and/or permanently.

In some embodiments, the PCM 220 continues to direct the network communications for the software application directly to the assigned server 230 until a failure occurs and/or is determined/detected (e.g., a request is not responded to or there is an error in attempted communication with the assigned server, such as an HTTP 504 gateway timeout error).

Figure 6:
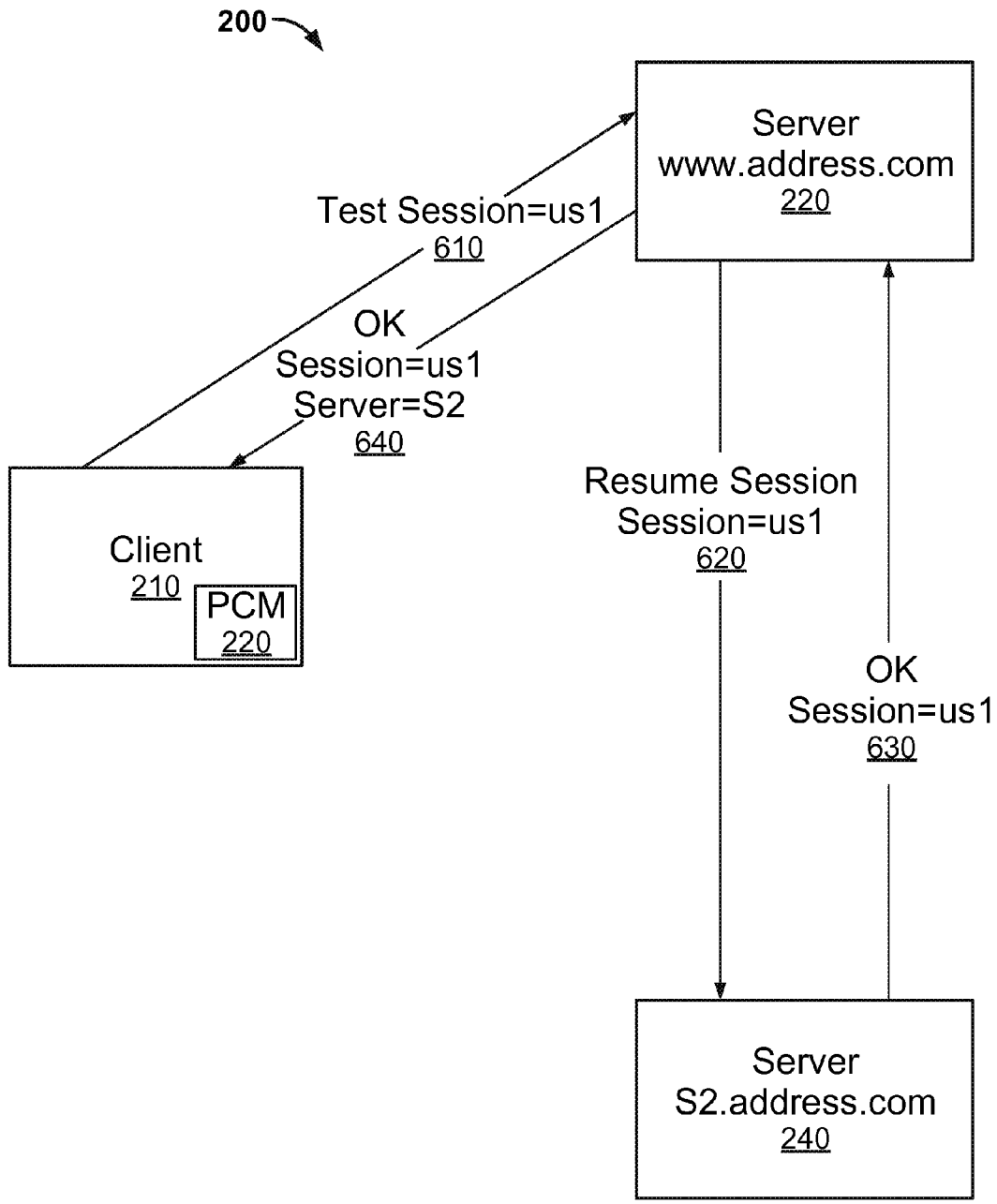
FIG. 6 illustrates a system for software load balancing in which the client sends a resume session request in accordance with some embodiments.

FIG. 6 illustrates a system for software load balancing in which the client sends a resume session request in accordance with some embodiments. As shown in FIG. 6, the server 230 is unavailable to the client 210 for the service, temporarily and/or permanently (e.g., indicated by not showing the presence of the server 230 in FIG. 6). The client 210 sends a resume session request 610 (e.g., Test session=us1) to the server 220 (e.g., the central server). In some embodiments the resume session request 610 does not require that the client 210 re-establish/resubmit user credentials for login, which thereby abbreviates the resume session setup/process (e.g., allowing for a more efficient recovery from a server failure/unavailability of the server 230 for the session with the client 210). The server 220 sends a resume session request 620 (e.g., ResumeSession session=us1) to the server 240. In some embodiments, the server 240 is selected by, for example, a hashing function (e.g., if there were multiple servers available to select from the set of servers). The server 240 sends a response to the resume session request 630 (e.g., OK Session=us1) to the server 220. The server 220 confirms the resume session 640 (e.g., OK Session=us1 Server=s2) with the client 210, in which the server 240 is indicated as the designated server for the client 210 for resuming the session for the service.

In some embodiments, the PCM 220 executes error handling logic to determine and process such communication errors. For example, the PCM 220 determines that a communication error has occurred, and the PCM 220 then initiates an attempt to communicate with the central network address as shown in FIG. 6. In some embodiments, the PCM 220 executes a recovery loop, periodically initiating requests to the central server/network load balancer for a new assigned server to resume the session (e.g., periodically sending the request 610 to the server 220). In some embodiments, this logic for maintaining such persistent connections with the assigned server(s) is performed in a logic layer of the PCM 220 (e.g., a logic layer in a Flash player/application, a logic layer in a browser implemented in, for example, JavaScript, and/or in a logic layer of any other software application that maintains such persistent sessions/connections). In some embodiments, the software application utilizes an HTML browser engine for the network communications with the servers 220, 230, and 240.

Figure 7:
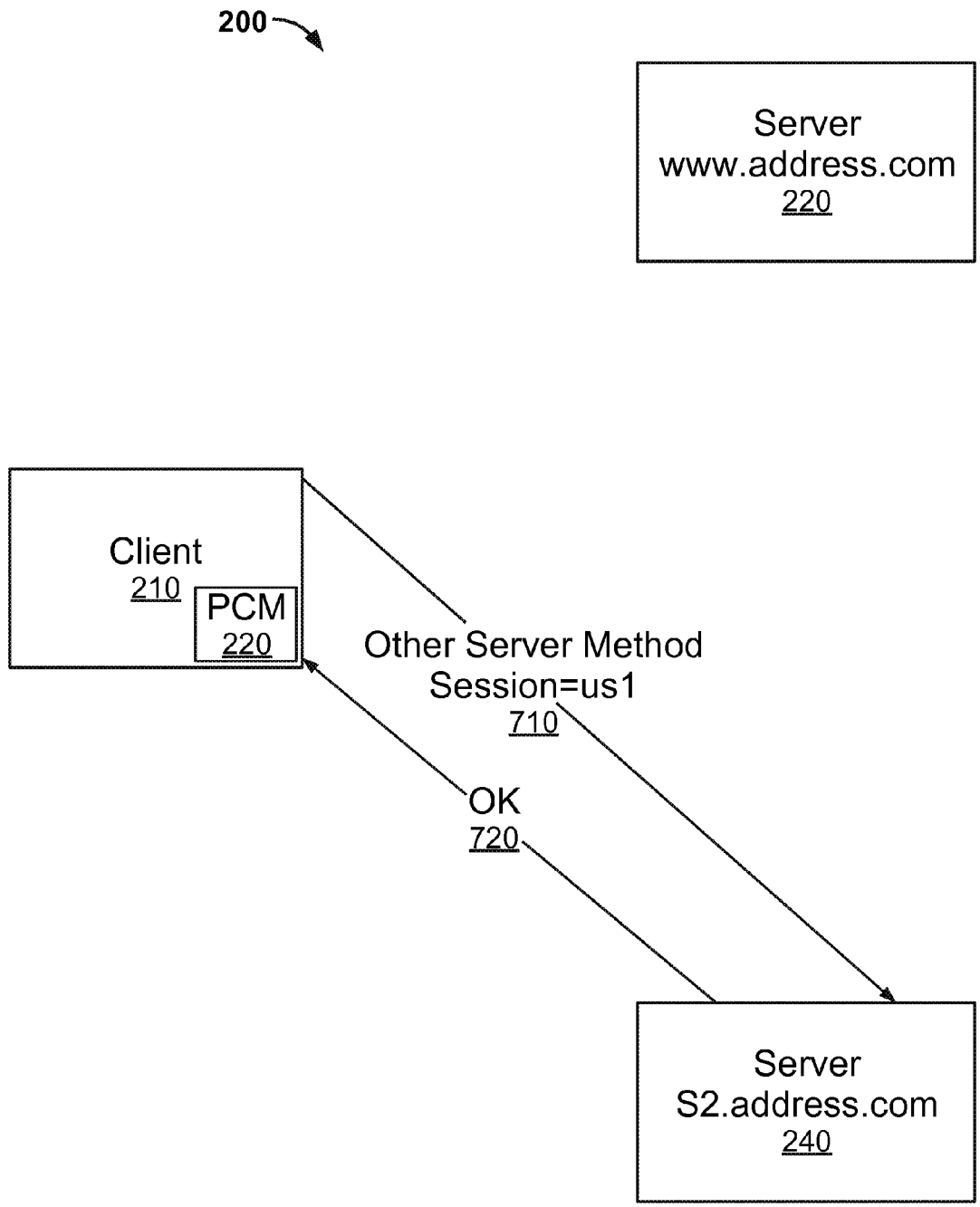
FIG. 7 illustrates a system for software load balancing in which the second server is designated in response to the resume session request from the client in accordance with some embodiments.

FIG. 7 illustrates a system for software load balancing in which the second server is designated in response to the resume session request from the client in accordance with some embodiments. The client 210 resumes the session 710 (e.g., OtherServerMethod Session=us1) with the server 240. The server 240 confirms the new session initiation 720 (e.g., OK) with the client 210. For example, a token/ticket or session cookie can be used for a server side lookup to provide state for to resume the session (e.g., a list of documents previously accessed/cached and/or user credentials, etc.), and the state information can be sent from the server 220 to the new designated server 240 (e.g., when the client 210 connects directly to/communicates directly with the new designated server 240, the client 210 can provide that token/ticket or session cookie to the new designated server 240 for state information lookup).

Figure 8:
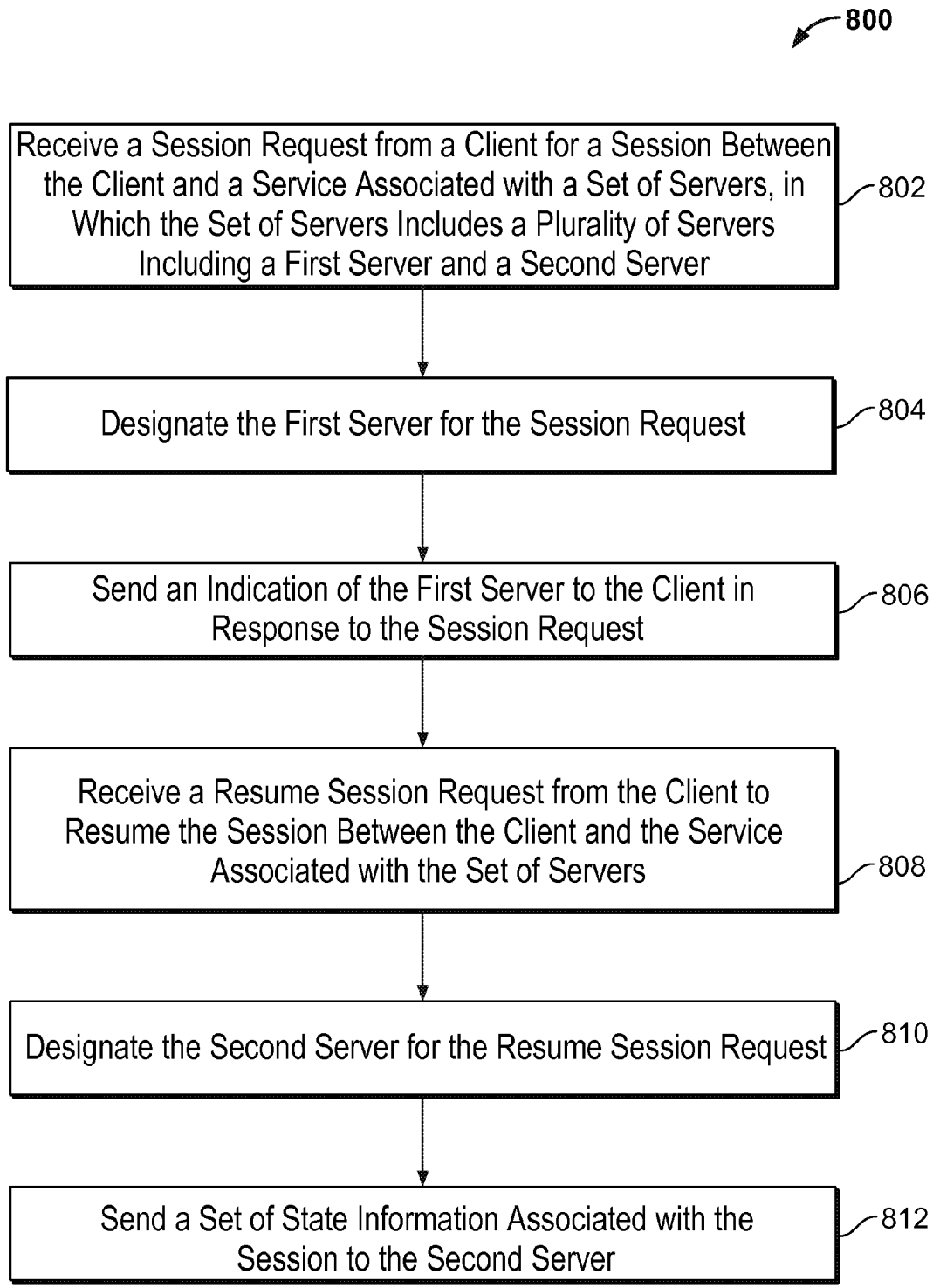
FIG. 8 is a server side flow diagram for software load balancing in accordance with some embodiments.

FIG. 8 is a server side flow diagram for software load balancing in accordance with some embodiments. In particular, FIG. 8 provides a server side example of a flow diagram for software load balancing in accordance with some embodiments. At 802, a session request is received from a client (e.g., client 210) for a session between the client and a service associated with a set of servers, in which the set of servers includes a plurality of servers including a first server (e.g., server 230) and a second server (e.g., server 240). In some embodiments, the system includes a server cloud, and the server cloud includes the central server (e.g., server 220) and the set of servers (e.g., servers 230 and 240). At 804, the first server is designated for the session request. In some embodiments, the first server is designated based on a hashing function. At 806, an indication of the first server is sent to the client in response to the session request. In some embodiments, the session is established between the client and the first server, and after the session is established between the client and the first server, the client then continues to communicate directly with the first server. At 808, a resume session request is received from the client to resume the session between the client and the service associated with the set of servers. At 810, the second server is designated for the resume session request. In some embodiments, an indication of the second server is sent to the client in response to the resume session request. In some embodiments, the session is resumed with the second server after a session interruption in which the first server was no longer available and/or busy. At 812, a set of state information associated with the session is sent to the second server (e.g., a list of documents that the user should have access to on the server and/or any other state information). In some embodiments, the session is resumed between the client and the second server, in which the second server uses the state information associated with the session.

Figure 9:
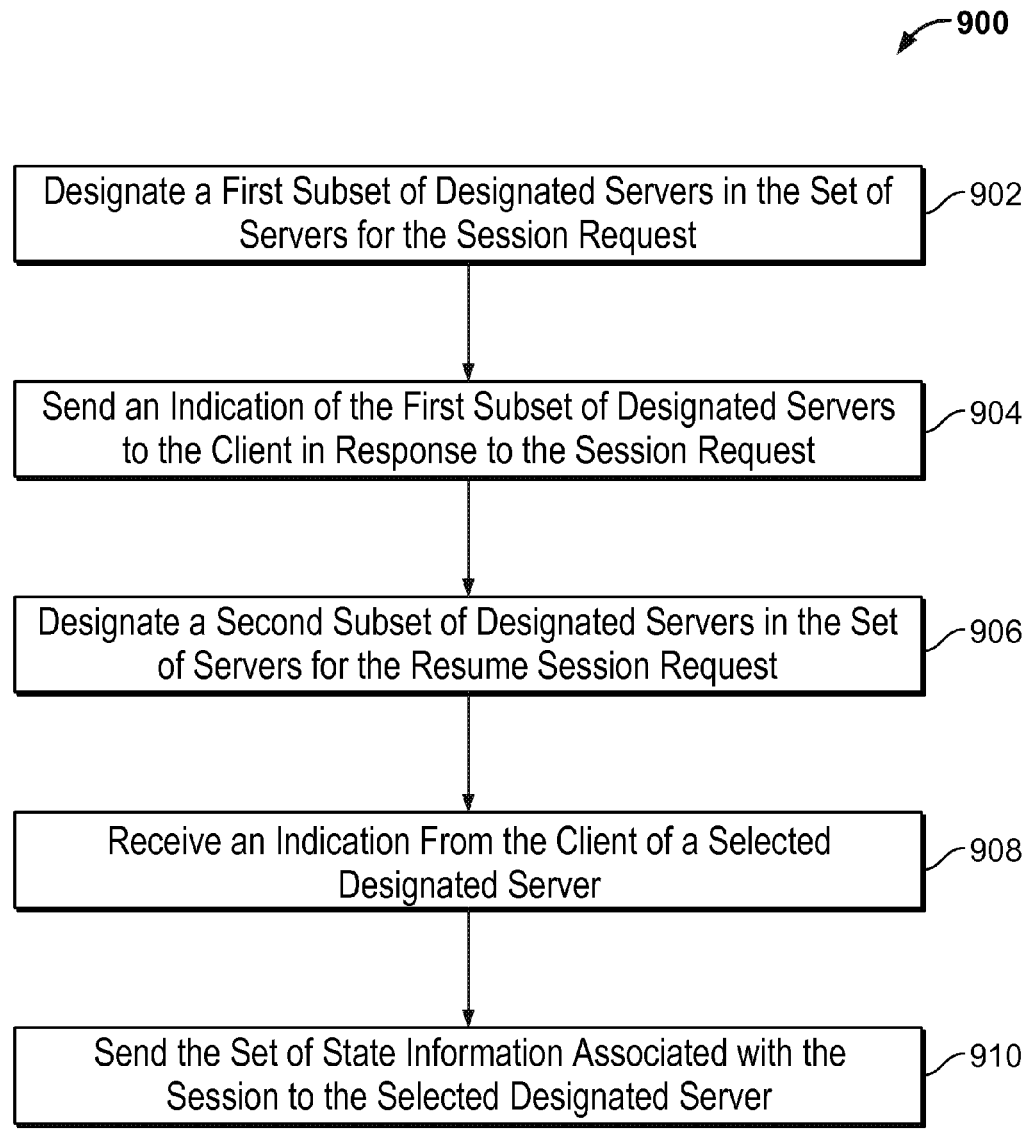
FIG. 9 is another server side flow diagram for software load balancing in accordance with some embodiments.

FIG. 9 is another server side flow diagram for software load balancing in accordance with some embodiments. In particular, FIG. 9 provides another server side example of a flow diagram for software load balancing in accordance with some embodiments. At 902, a first subset of designated servers in the set of servers is designated for the session request. At 904, an indication of the first subset of designated servers is sent to the client in response to the session request. At 906, a second subset of designated servers in the set of servers is designated for the resume session request. At 908, an indication is received from the client of a selected designated server. In some embodiments, the client selects a designated server from the first/second subset of designated servers based on various criteria (e.g., based on a type of service, a geography, a responsiveness, a network/server capacity, a congestion testing, and/or any other network/service/server based criteria). At 910, the set of state information associated with the session is sent to the selected designated server.

Figure 10:
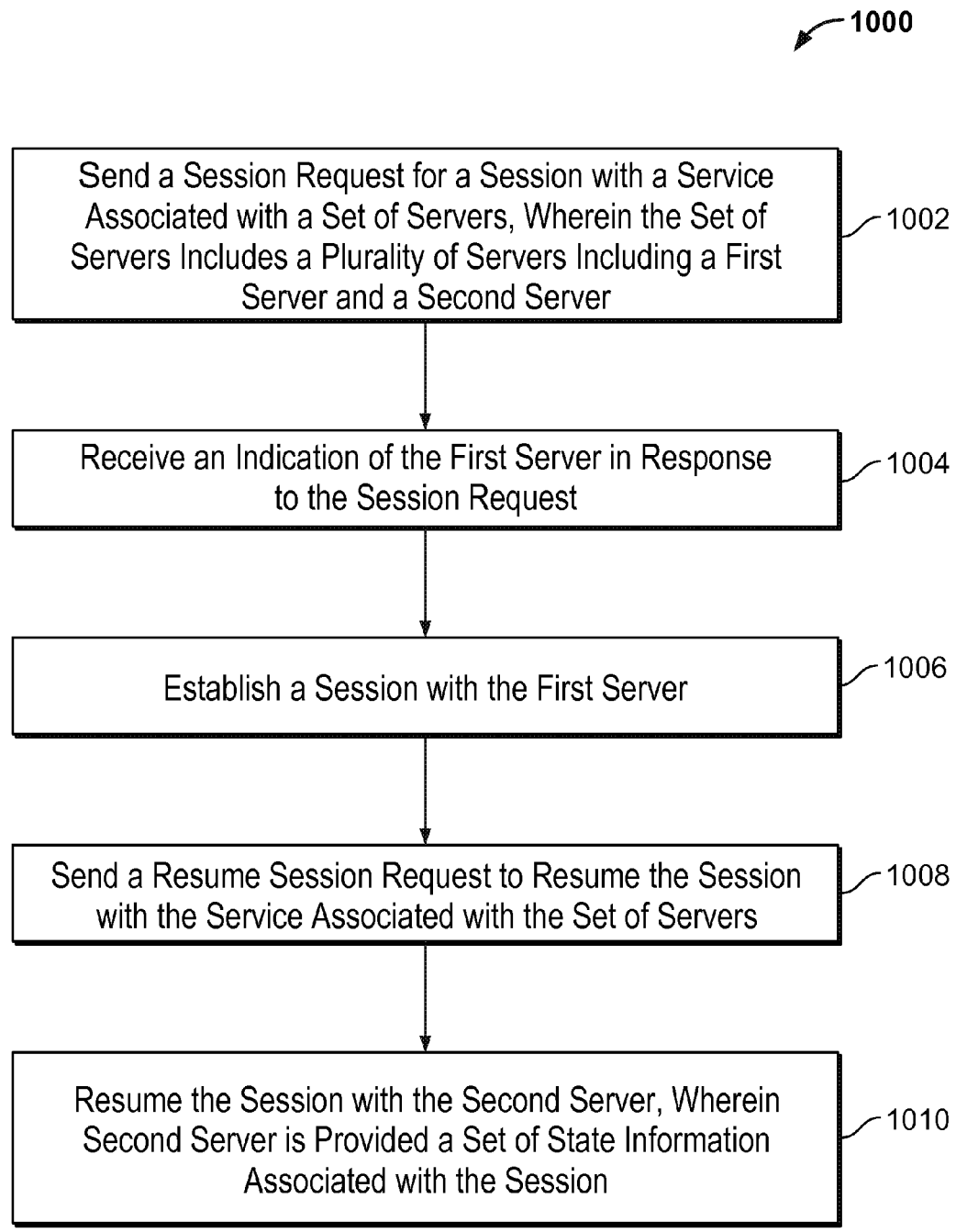
FIG. 10 is a client side flow diagram for software load balancing in accordance with some embodiments.

FIG. 10 is a client side flow diagram for software load balancing in accordance with some embodiments. In particular, FIG. 10 provides a client side example of a flow diagram for software load balancing in accordance with some embodiments. At 1002, a session request is sent for a session with a service associated with a set of servers, in which the set of servers includes a plurality of servers including a first server and a second server (e.g., servers 230 and 240). In some embodiments, the set of servers includes a server cloud, and the server cloud includes the central server (e.g., server 220) and the set of servers (e.g., servers 230 and 240). At 1004, an indication of the first server is received in response to the session request. At 1006, a session is established with the first server. In some embodiments, an indication that the first server is no longer available is received/determined (e.g., an indication that the first session connection with the first server is no longer available and/or has failed; and/or a determination that the first server is busy and/or network capacity for communicating with the first server has exceeded a threshold, such as based on time/capacity and/or other criteria), and the client can attempt to resume the session with another server providing the service (e.g., in the server cloud). At 1008, a resume session request is sent to resume the session with the service associated with the set of servers. At 1010, the session is resumed with the second server, in which second server is provided a set of state information associated with the session for efficiently and seamlessly resuming the session. In some embodiments, the client can request to reestablish/resume the session with a different server providing the service (e.g., in the server cloud).

Figure 11:
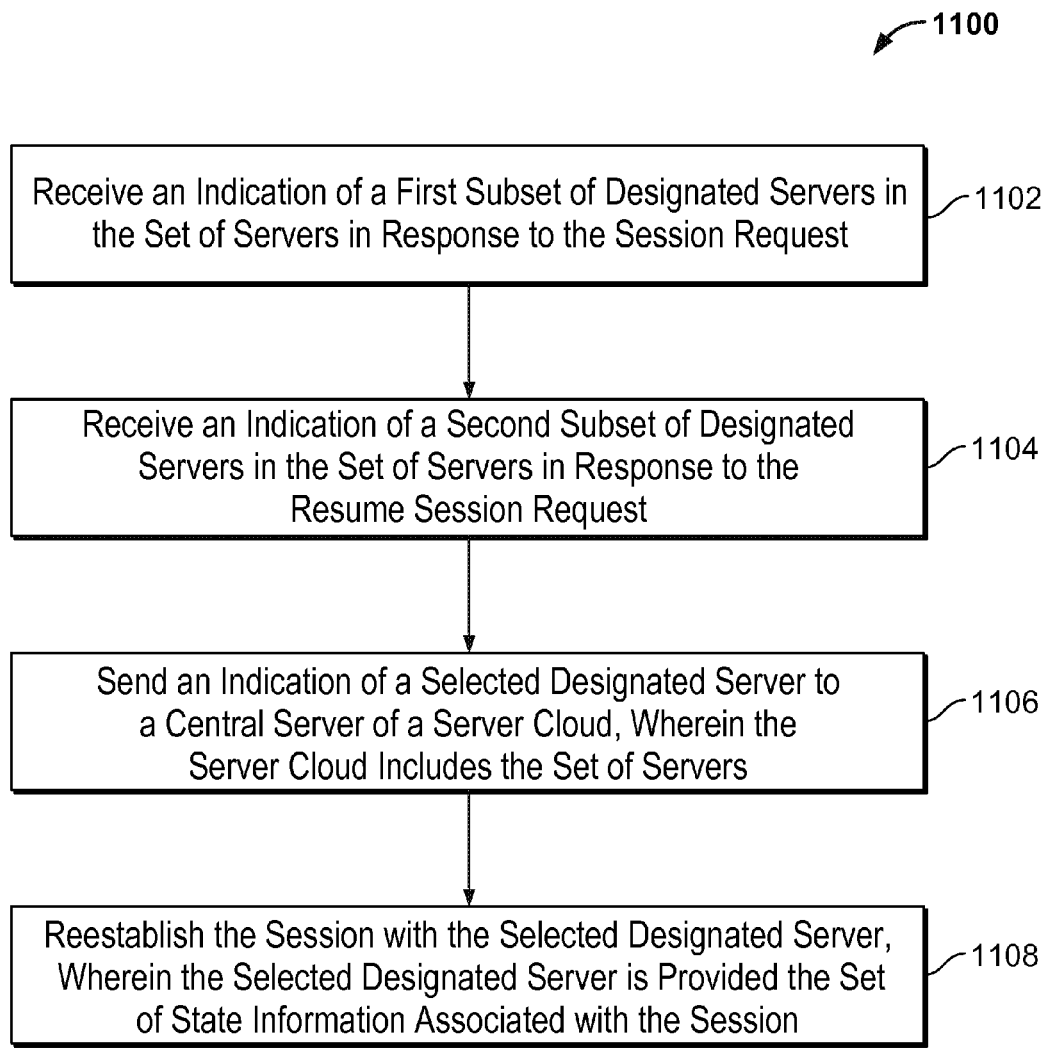
FIG. 11 is another client side flow diagram for software load balancing in accordance with some embodiments.

FIG. 11 is another client side flow diagram for software load balancing in accordance with some embodiments. In particular, FIG. 11 provides another client side example of a flow diagram for software load balancing in accordance with some embodiments. At 1102, an indication of a first subset of designated servers in the set of servers is received in response to the session request. At 1104, an indication of a second subset of designated servers in the set of servers is received in response to the resume session request. At 1106, an indication of a selected designated server is sent to a central server of a server cloud, in which the server cloud includes the set of servers. In some embodiments, the client selects a designated server from the first/second subset of designated servers based on various criteria (e.g., based on a type of service, a geography, a responsiveness, a network/server capacity, a congestion testing, and/or any other network/service/server based criteria). At 1108, the session is reestablished with the selected designated server, in which the selected designated server is provided the set of state information associated with the session.

Figure 12:
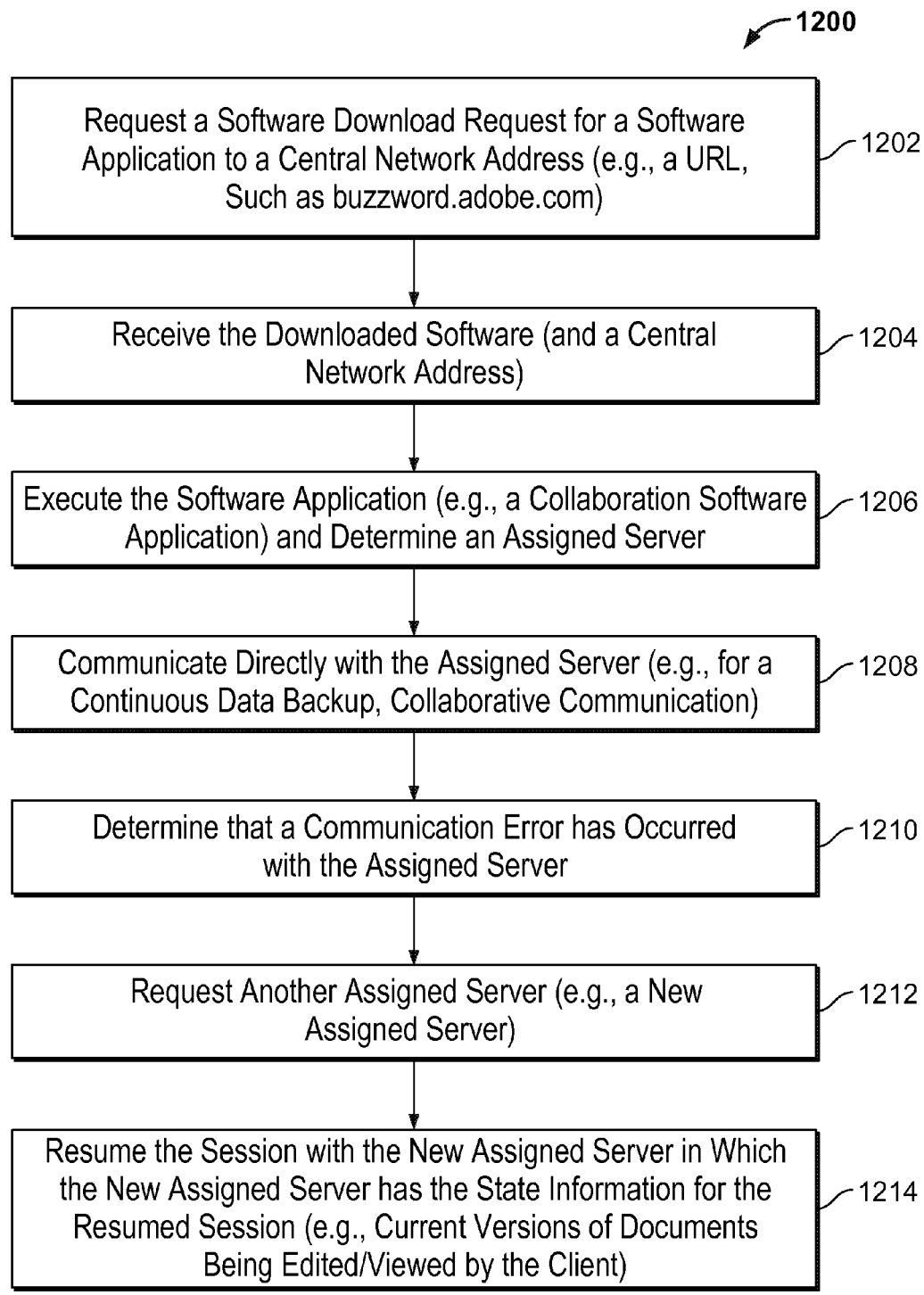
FIG. 12 is a flow diagram for software load balancing for a software application executed on a client in accordance with some embodiments.

FIG. 12 is a flow diagram for software load balancing for a software application executed on a client in accordance with some embodiments. At 1202, a client (e.g. client 210) requests a software download request for a software application from a central network address (e.g., a URL, such as buzzword.adobe.com). At 1204, the client receives the downloaded software. In some embodiments, the downloaded software and/or communication includes a central network address for initiating subsequent network communications for the software application. In some embodiments, the central network address is the same network address as that from which the software is/was downloaded at 1204. For example, the software application can be a collaborative platform, such as that for sharing and editing electronic content, such as documents and/or any other data/content to be edited/viewed/shared collaboratively (e.g., by multiple users), in which the data can be shared/accessible via the network (e.g., the Internet and/or an intranet or any other network). For example, a first user can make edits to a document while another user can then access that edited document and make further edits to and/or view that same document. In order to maintain such collaboration effectively, the edits generally should be reflected on a network copy by providing continuous backups/replications of such changes made by each user. Accordingly, providing a persistent connection/session in such and other applications is critical (e.g., being able to quickly resume sessions and maintain state information in the resumed sessions so as to appear transparent, seamless to the user(s) of the software application/collaborative software platform).

At 1206 the software application is executed on the client (e.g., the processor 102) and an assigned server is determined. At 1208, the software application (e.g., using PCM 220) communicates directly with the assigned server (e.g., providing for continuous data backup, collaborative communication, etc.). At 1210, the client (e.g., using the PCM 220) determines whether a communication error has occurred with the assigned server, and then a recovery loop can be performed to efficiently and quickly resume the session (e.g., using the PCM 220). At 1212, another assigned server (e.g., a new assigned server) is requested by the client (e.g., via a request sent directly to the central network address). At 1214, the session is seamlessly resumed with the new assigned server as the new assigned server is provided the necessary state information for the resumed session (e.g., the document(s) being worked on by the client and their current versions/edits of any such document(s)). Accordingly, an efficient and seamless recovery of a persistent connection/session is provided (e.g., such resumed sessions can be transparent to the user(s) of the software application/collaborative software platform).

Although the foregoing embodiments have been described in some detail for purposes of clarity of understanding, the techniques are not limited to the details provided. There are many alternative ways of implementing the techniques. The disclosed embodiments are illustrative and not restrictive.

What is claimed is:

1. A system, comprising:
a processor configured to:
receive a session request from a client for a session between the client and a service associated with a set of servers, wherein the set of servers includes a plurality of servers including a first server and a second server;
designate the first server for the session request;
send an indication of the first server to the client in response to the session request, wherein the client can communicate directly with the first server;
receive a resume session request from the client to resume the session between the client and the service associated with the set of servers, wherein the resume session request includes a token or a session cookie;
designate the second server for the resume session request; and
send a set of state information associated with the session based on the token or the session cookie to the second server, wherein the client can communicate directly with the second server; and
a memory coupled to the processor and configured to provide the processor with instructions.

2. The system recited in claim 1, wherein the system includes a server cloud, and wherein the server cloud includes a central server and the set of servers.

3. The system recited in claim 1, wherein the session is resumed after the session with the first server was interrupted.

4. The system recited in claim 1, wherein the first server is designated based on a hashing function.

5. The system recited in claim 1, wherein the processor is further configured to:
send an indication of the second server to the client in response to the resume session request.

6. The system recited in claim 1, wherein the processor is further configured to:
establish the session between the client and the first server, wherein the client communicates directly with the first server.

7. The system recited in claim 1, wherein the processor is further configured to:
designate a first subset of designated servers in the set of servers for the session request;
send an indication of the first subset of designated servers to the client in response to the session request;
designate a second subset of designated servers in the set of servers for the resume session request; and
send the set of state information associated with the session to a selected designated server of the second subset of designated servers.

8. The system recited in claim 1, wherein the processor is further configured to:
designate a first subset of designated servers in the set of servers for the session request;
send an indication of the first subset of designated servers to the client in response to the session request;
designate a second subset of designated servers in the set of servers for the resume session request;
receive an indication from the client of a selected designated server; and
send the set of state information associated with the session to the selected designated server.

9. The system recited in claim 1, wherein the processor is further configured to:
resume the session between the client and the second server, wherein the second server uses the state information associated with the session, and wherein the client communicates directly with the second server; and
perform a server side lookup based on the token or the session cookie to determine a set of documents previously accessed during the session before the resume session request, wherein the service is a collaborative platform for sharing and editing documents.

10. A method comprising:
receiving a session request from a client for a session between the client and a service associated with a set of servers, wherein the set of servers includes a plurality of servers including a first server and a second server;
designating the first server for the session request;
sending an indication of the first server to the client in response to the session request, wherein the client can communicate directly with the first server;
receiving a resume session request from the client to resume the session between the client and the service associated with the set of servers, wherein the resume session request includes a token or a session cookie;
designating the second server for the resume session request; and
sending a set of state information associated with the session based on the token or the session cookie to the second server, wherein the client can communicate directly with the second server.

11. The method recited in claim 10, wherein sending the set of state information associated with the session to the second server is performed using a processor of one or more servers in a server cloud.

12. A system, comprising:
a processor configured to:
send a session request for a session with a service associated with a set of servers, wherein the set of servers includes a plurality of servers including a first server and a second server;
receive an indication of the first server in response to the session request;
establish a session with the first server;
send a resume session request to resume the session with the service associated with the set of servers, wherein the resume session request includes a token or a session cookie;
resume the session with the second server, wherein second server is provided a set of state information associated with the session based on the token or the session cookie; and
a memory coupled to the processor and configured to provide the processor with instructions.

13. The system recited in claim 12, wherein the system includes a client system.

14. The system recited in claim 12, wherein the processor is further configured to:
receive an indication that the first server is no longer available.

15. The system recited in claim 12, wherein the processor is further configured to:
receive an indication that the first session connection with the first server is no longer available and/or has failed.

16. The system recited in claim 12, wherein the processor is further configured to:
determine that the first server is busy and/or network capacity for communicating with the first server has exceeded a threshold.

17. The system recited in claim 12, wherein the processor is further configured to:
request to reestablish the session with a different server.

18. The system recited in claim 12, wherein the processor is further configured to:
receive an indication of a first subset of designated servers in the set of servers in response to the session request;
receive an indication of a second subset of designated servers in the set of servers in response to the resume session request;
send an indication of a selected designated server to a central server of a server cloud, wherein the server cloud includes the set of servers; and
reestablish the session with the selected designated server, wherein the selected designated server is provided the set of state information associated with the session.

19. A method comprising:
sending a session request for a session with a service associated with a set of servers, wherein the set of servers includes a plurality of servers including a first server and a second server;
receiving an indication of the first server in response to the session request;
establishing a session with the first server;
sending a resume session request to resume the session with the service associated with the set of servers, wherein the resume session request includes a token or a session cookie;
resuming the session with the second server, wherein second server is provided a set of state information associated with the session based on the token or the session cookie.

20. The method recited in claim 19, wherein sending the resume session request to resume the session with the service associated with the set of servers is performed using a processor.

21. The method recited claim 19, further comprising:
determining that the first server is busy and/or network capacity for communicating with the first server has exceeded a threshold.

22. The method recited in claim 19, further comprising:
requesting to reestablish the session with a different server.

23. The method recited in claim 19, further comprising:
receiving an indication of a first subset of designated servers in the set of servers in response to the session request;
receiving an indication of a second subset of designated servers in the set of servers in response to the resume session request;
sending an indication of a selected designated server to a central server of a server cloud,
wherein the server cloud includes the set of servers; and
reestablishing the session with the selected designated server, wherein the selected designated server is provided the set of state information associated with the session.

24. A computer program product, the computer program product being embodied in a non-transitory computer readable storage medium and comprising computer instructions for:
sending a session request for a session with a service associated with a set of servers, wherein the set of servers includes a plurality of servers including a first server and a second server;
receiving an indication of the first server in response to the session request;
establishing a session with the first server;
sending a resume session request to resume the session with the service associated with the set of servers, wherein the resume session request includes a token or a session cookie;
resuming the session with the second server, wherein second server is provided a set of state information associated with the session based on the token or the session cookie.

25. The computer program product recited in claim 24, further comprising computer instructions for:

receiving an indication of a first subset of designated servers in the set of servers in response to the session request;
receiving an indication of a second subset of designated servers in the set of servers in response to the resume session request;
sending an indication of a selected designated server to a central server of a server cloud, wherein the server cloud includes the set of servers; and
reestablishing the session with the selected designated server, wherein the selected designated server is provided the set of state information associated with the session.

* * * * *